United States Patent [19]

Nissimov

[11] Patent Number: 5,018,095
[45] Date of Patent: May 21, 1991

[54] UNIVERSAL DISK DRIVE TYPE EMULATION FOR IBM PC-AT COMPUTERS

[75] Inventor: Haim N. Nissimov, West Hills, Calif.
[73] Assignee: Seagate Technology, Inc., Scotts Valley, Calif.
[21] Appl. No.: 480,650
[22] Filed: Feb. 15, 1990
[51] Int. Cl.⁵ .......................... G06F 9/00; G06F 13/12
[52] U.S. Cl. .................................. 364/900; 364/952.1; 364/968
[58] Field of Search ............................................ 360/49

[56] References Cited

U.S. PATENT DOCUMENTS

| | | | |
|---|---|---|---|
| 3,527,262 | 7/1985 | Manto | 369/33 |
| 4,399,503 | 8/1983 | Hawley | 364/200 |
| 4,494,156 | 1/1985 | Kadison et al. | 360/48 |
| 4,509,118 | 4/1985 | Shenk | 364/200 |
| 4,527,262 | 7/1985 | Manto | 369/33 |
| 4,569,049 | 2/1986 | McNamara | 371/25 |
| 4,583,194 | 4/1986 | Cage | 364/900 |
| 4,591,997 | 5/1986 | Grabel | 364/519 |
| 4,680,653 | 7/1987 | Ng et al. | 360/72.2 |
| 4,707,750 | 11/1987 | Anderson et al. | 360/60 |
| 4,747,038 | 5/1988 | Bradley et al. | 364/200 |
| 4,773,036 | 9/1988 | Berens et al. | 364/900 |
| 4,780,866 | 10/1988 | Syracuse | 360/78.04 |

OTHER PUBLICATIONS

*Mastering DOS* 2nd edition by Robbins, Chap. 11, p. 266.
*Hard Disk Heavyweights*, by Winn L. Rosch, Jun. 9, 1987, pp. 13-27.

*Primary Examiner*—John H. Wolff
*Assistant Examiner*—Varsha V. Sheladia
*Attorney, Agent, or Firm*—Kinney & Lange

[57] ABSTRACT

A disk drive is configured for use in a data storage system of the type having a computer coupled to the disk drive for storing data on storage media in the disk drive and for retrieving data from the storage media in the disk drive. The storage media has a physical capacity. A plurality of first logical drive address parameters are received from the computer. Second drive address parameters are determined based on the first logical drive address parameters and the physical storage capacity of the storage media. The disk drive is controlled as a function of the first and second logical drive address parameters.

48 Claims, 6 Drawing Sheets

STEP 1 RECEIVE LOGICAL DRIVE ADDRESS PARAMETERS FROM HOST COMPUTER

STEP 2 #LOGICAL SECTORS PER LOGICAL CYLINDER
= (#LOGICAL HEADS) × (#LOGICAL SECTORS PER TRACK) = RESULT A (SAVED)

STEP 3 TOTAL PHYSICAL SECTORS (CAPACITY)
= (#PHYSICAL SECTORS PER CYLINDER) × (#PHYSICAL CYLINDERS)
= RESULT B (SAVED)

STEP 4 MAXIMUM LOGICAL CYLINDER ADDRESS = (RESULT B) / (RESULT A)

*Fig. 4*

STEP 1

LOGICAL BLOCK ADDRESS = ((INPUT LOGICAL CYLINDER ADDRESS) × (#LOGICAL SECTORS PER CYLINDER)) + ((INPUT LOGICAL HEAD ADDRESS) × (#LOGICAL SECTORS PER TRACK)) + (INPUT LOGICAL SECTOR ADDRESS)

STEP 2

(LOGICAL BLOCK ADDRESS) / (#PHYSICAL SECTORS PER CYLINDER) = PHYSICAL CYLINDER ADDRESS + REMAINDER 1

STEP 3

(REMAINDER 1) / (#PHYSICAL SECTORS PER TRACK) = PHYSICAL HEAD ADDRESS + REMAINDER 2

STEP 4

PHYSICAL SECTOR ADDRESS = REMAINDER 2

INPUT LOGICAL CYLINDER ADDRESS = 0
LOGICAL SECTORS PER CYLINDER = X (DOES NOT MATTER SINCE INPUT LOGICAL CYLINDER ADDRESS = 0)
INPUT LOGICAL HEAD ADDRESS = 1
LOGICAL SECTORS PER TRACK = 17
INPUT LOGICAL SECTOR ADDRESS = 16
∴ LOGICAL BLOCK ADDRESS = $(0*X) + (1*17) + 16 = 33$

UNIVERSAL DISK DRIVE TYPE EMULATION FOR IBM PC-AT COMPUTERS

BACKGROUND OF THE INVENTION

1. Field of the Invention

The present invention relates to hard disk file storage systems. More particularly, the present invention relates to a disk drive in a hard disk file data storage system.

2. Description of the Prior Art

Disk file data storage systems contain one or more magnetic disks on which data is stored in sectors which lie in concentric tracks on the disks. A transducer (or head) flies above a track and writes, or magnetically encodes, the data in a sector on the track. The head is also capable of reading the magnetically encoded data from the sectors.

An electromechanical actuator operates within a negative feedback, closed-loop servo system. The actuator moves the head radially for track seek operations and holds the transducer directly over a track for track following operations.

Typically, a file of disks is stacked on a spindle. Each surface on each magnetic disk has one corresponding head. All heads are moved together by the electromechanical actuator to different tracks on the disk surface. The collection of the tracks under all heads at any given radial position along the disk file is known as a cylinder. Data read from the sectors by the heads is demodulated in a disk drive interface and provided to a host computer.

In the past, serial or classical disk drive interfaces, such as the ESDI or ST506 interfaces demodulated the data read from the track on the magnetic disk and provided it in serial form. An additional component, known as a disk drive controller, checked the integrity of the data provided by the serial disk drive interface and converted the serial flow of data into a parallel flow. The parallel information was then provided by the disk drive controller to a host computer.

More recently, disk drive interfaces have been designed with more intelligence than the classical or serial disk drive interfaces. Examples of such intelligent disk drive interfaces are the SCSI and PCAT (which was invented based on the PC-AT computer design) interfaces. Functionally, these intelligent interfaces and the disk drive controller have become part of the disk drive and provide parallel data to the host computer Most PC-AT type host computers are programmed to operate with a number of specific disk drive types. The PC-AT type host computer contains a table of disk drive types which it will operate with. That table contains the number of cylinders, heads and sectors per track for each drive type entered in the table. This table is fixed in the Basic Input/Output System (BIOS) ROM.

A power up program located in the BIOS ROM provides the disk drive controller with the disk drive parameters, from the table, which correspond to the drive type that the host computer is programmed for. The disk drive controller then configures itself to match the table entry corresponding to the disk drive parameters provided by the power up program.

All disk drive types included in the table in the PC-AT type computer use a sector number of 17 sectors per track with a specific number of heads and cylinders.

The fixed table imposes a limitation on the maximum disk drive capacity that the lost computer can access. This is an increasing problem with the advances being made in enlarging disk capacity.

The computer typically addresses the disk drive through BIOS calls. Presently, typical BIOS programs allow up to 1024 cylinders, 16 heads and 64 sectors per track to be addressed Hence, the maximum disk drive capacity addressable by BIOS is 1,048,576 blocks (536,870,912 bytes). But, if the computer cannot address more than 17 sectors per track because of the inflexible disk drive type table, the addressable disk drive capacity is cut down to 278,528 blocks (142,606,336 bytes).

SUMMARY OF THE INVENTION

In the present invention, a disk drive is configured for use in a data storage system of the type having a computer coupled to the disk drive for storing data on storage media in a disk drive and for retrieving data from the storage media in the disk drive. The storage media has a physical storage capacity. A plurality of first logical drive address parameters are received from the computer. Second drive address parameters are determined based on the first logical drive address parameters and the physical configuration of the storage media. The disk drive is controlled as a function of the first and second logical drive address parameters.

DETAILED DESCRIPTION OF THE PREFERRED EMBODIMENTS

1. Introduction

Figure 1:
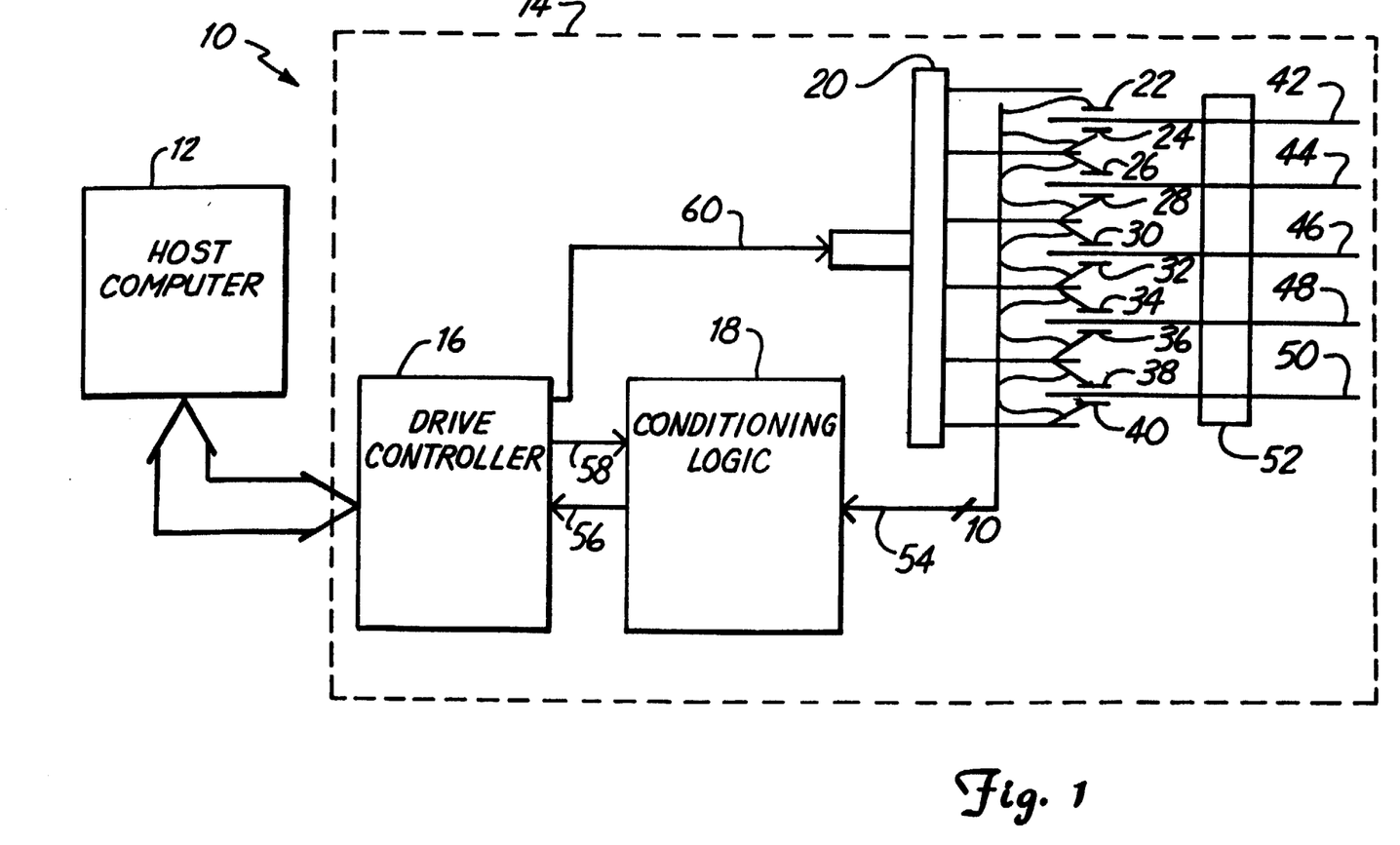
FIG. 1 is a block diagram of a data storage system.

FIG. 1 is a block diagram of hard disk file data storage system 10 (data storage system 10). Data storage system 10 includes host computer 12 and disk drive 14. Disk drive 14 includes drive controller 16, conditioning logic 18, actuator 20 transducers or read/write heads 22, 24, 26, 28, 30, 32, 34, 36, 38 and 40 (heads 22—40), magnetic disks 42, 44, 46, 48 and 50 (disks 42-50) and spindle 52.

During operation, disks 42-50 spin with spindle 52. Heads 22-40 fly above disks 42-50 either reading magnetically encoded data from the surfaces of disks 42-50 or encoding (writing) information on the disk surfaces While reading information, heads 22-40 produce signals representative of the data on the disk surfaces and provide those signals to conditioning logic 18. Conditioning logic 18 conditions the signals and provides them in serial form to drive controller 16. This flow of information from heads 22-40 to drive controller 16 is indicated by arrows 54 and 56.

Drive controller 16, in turn, converts the serial data received from conditioning logic 18 into parallel data and provides it to host computer 12. Drive controller 16 also receives control information from host computer 12. Based on that control information and position error information read from disks 22-40, drive controller 16 provides control signals to conditioning logic 18 and actuator 20. This is indicated by arrows 58 and 60.

The control signals provided by drive controller 16 to conditioning logic 18 dictate, for example, which head conditioning logic 18 should demodulate and provide to drive controller 16. The control signals provided to actuator 20 cause actuator 20 to rotate. Rotation of actuator 20 causes heads 22-40 to move radially with respect to disks 42-50.

Figure 2:
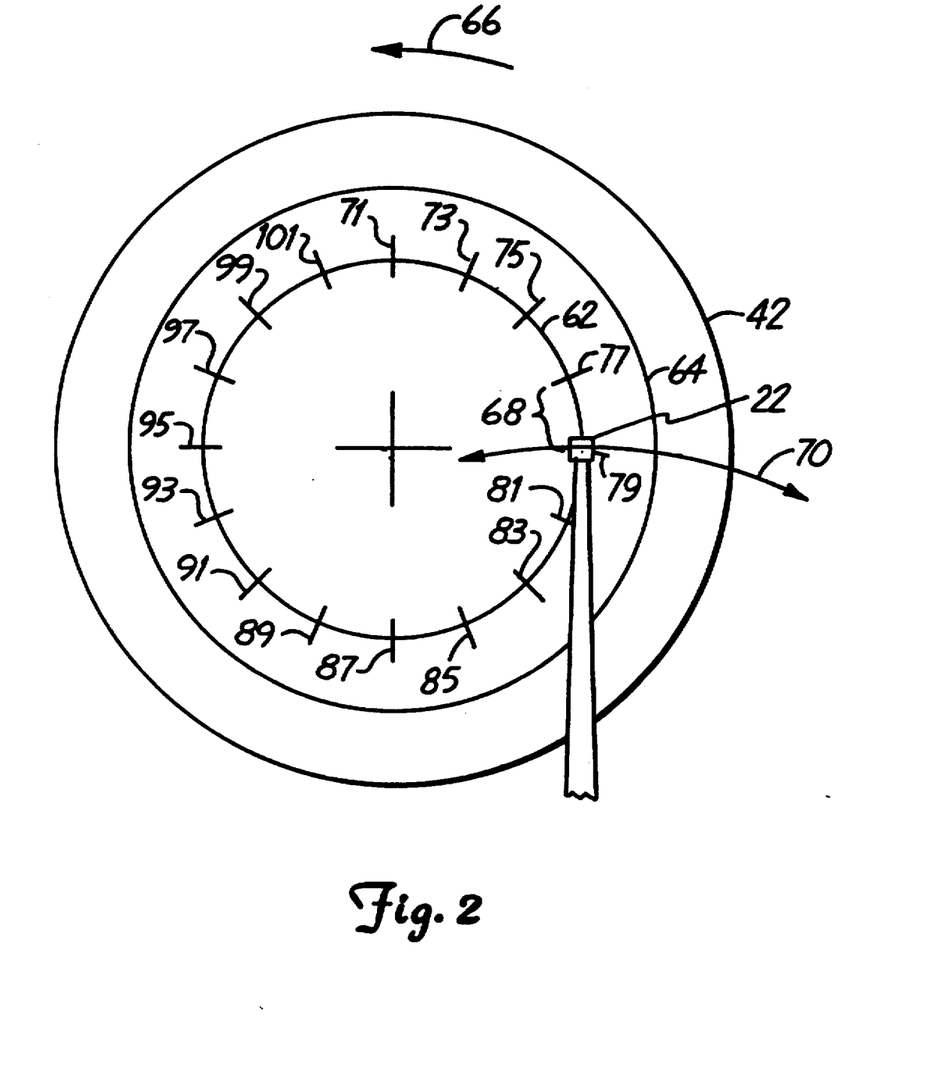
FIG. 2 is a top view of a disk in the data storage system shown in FIG. 1.

FIG. 2 shows a typical disk surface. The surface of disk 42 contains a plurality of tracks. For clarity, only two tracks, 62 an 64 are shown in FIG. 2. Each track on the surface of disk 42 is divided into sectors. The sector divisions on track 62 are indicated by the radially oriented cross hatched lines 71, 73, 75, 77, 79, 81, 83, 85, 87, 89, 91, 93, 95, 97, 99, and 101. Head 22 is shown positioned over sector 68 of track 62 on disk 42. As disk 42 rotates in the direction indicated by arrow 66, head 22 flies above track 62 and data is read from or written to track 62. As actuator 20 moves heads 22-40, head 22 moves radially with respect to disk 42 in an arc indicated by arrow 70. All heads are moved together as actuator 20 rotates. Therefore, heads 22-40 are simultaneously moved over corresponding tracks on each disk as actuator 20 rotates. The collection of tracks under heads 22-40 at a given radial position is known as a cylinder. Therefore, the number of cylinders and the number of tracks per surface on disks 42-50 is the same. Also, the number of tracks per cylinder is the same as the number of heads 22-40 in disk drive 14.

An individual data sector on one of disks 42-50 is addressed by its cylinder address, head address and sector number. The term "address" implies a number in a sequence starting with 0. The term "number" implies a number in a sequence starting with 1. For example, the first sector available in disk drive 14 is addressed as cylinder 0, head 0 and sector 1. Hence, when host computer 12 wants to access a particular sector or sectors on one of disks 42-50, it specifies to drive controller 16 the requested sector number, head address and cylinder address. Drive controller 16, in turn, causes actuator 20 to move heads 22-40 to the correct cylinder. Drive controller 16 also causes conditioning logic 18 to demodulate information from the correct head.

Figure 3:
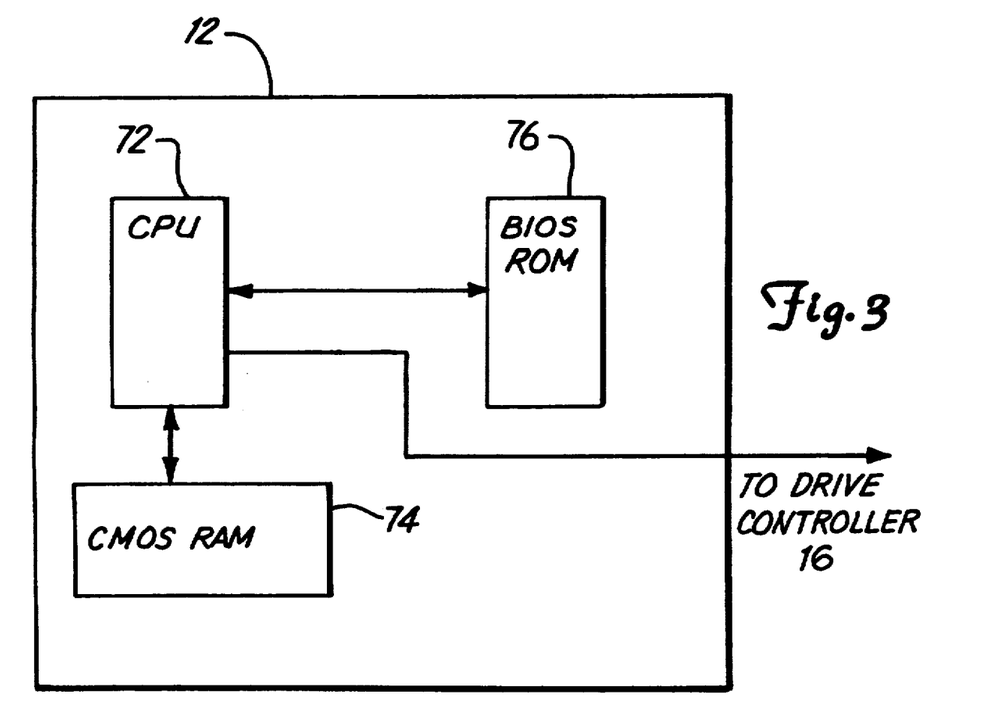
FIG. 3 is a more detailed block diagram of the host computer shown in FIG. 1.

FIG. 3 is a more detailed block diagram of host computer 12. Host computer 12 includes CPU 72, CMOS RAM 74 and BIOS ROM 76.

If host computer 12 is a typical PC-AT type computer, it contains a table of disk drive types which is fixed in the BIOS ROM. The table defines the number of cylinders, heads and sectors per track for each drive type in the table. During power up, a BIOS power up program causes CPU 72 to send drive controller 16 drive parameters which correspond to one of the drives in the table. The drive parameters correspond to the drive type which host computer 12 expects to be installed. The drive parameters sent to drive controller 16 typically include the maximum number of sectors per track and the maximum head address that host computer 12 expects to access during operation.

When the physical parameters of disk drive 14 exactly match the parameters sent by host computer 12 upon power up, disk drive 14 is said to be operating in the physical mode. However, more typically, the actual physical parameters of disk drive 14 differ from those expected by host computer 12. In that case, disk drive 14 is said to be operating in the logical mode. In the logical mode, it becomes necessary to convert a logical data sector address specified by host computer 12 into the actual or physical data sector address that can be accessed by drive controller 16.

In other words, in the physical mode, host computer 12 recognizes the actual number of cylinders, heads and sectors per track in disk drive 14 and addresses them with the proper physical address In the logical mode, on the other hand, drive controller 16 must convert logical addresses provided by host computer 12 into actual, physical addresses in disk drive 14.

In order for the entire physical storage capacity of disk drive 14 to be utilized, two things must be done First, disk drive 14 must be initialized based on the logical disk drive parameters provided by host computer 12 from the table of disk drives stored in the BIOS ROM and based on the physical storage capacity of disk drive 14. Second, disk drive 14 must actually accept logical addresses from host computer 12 and convert them into physical addresses so that the proper data can be accessed on disks 42-50.

2. Initialization

Figure 4:
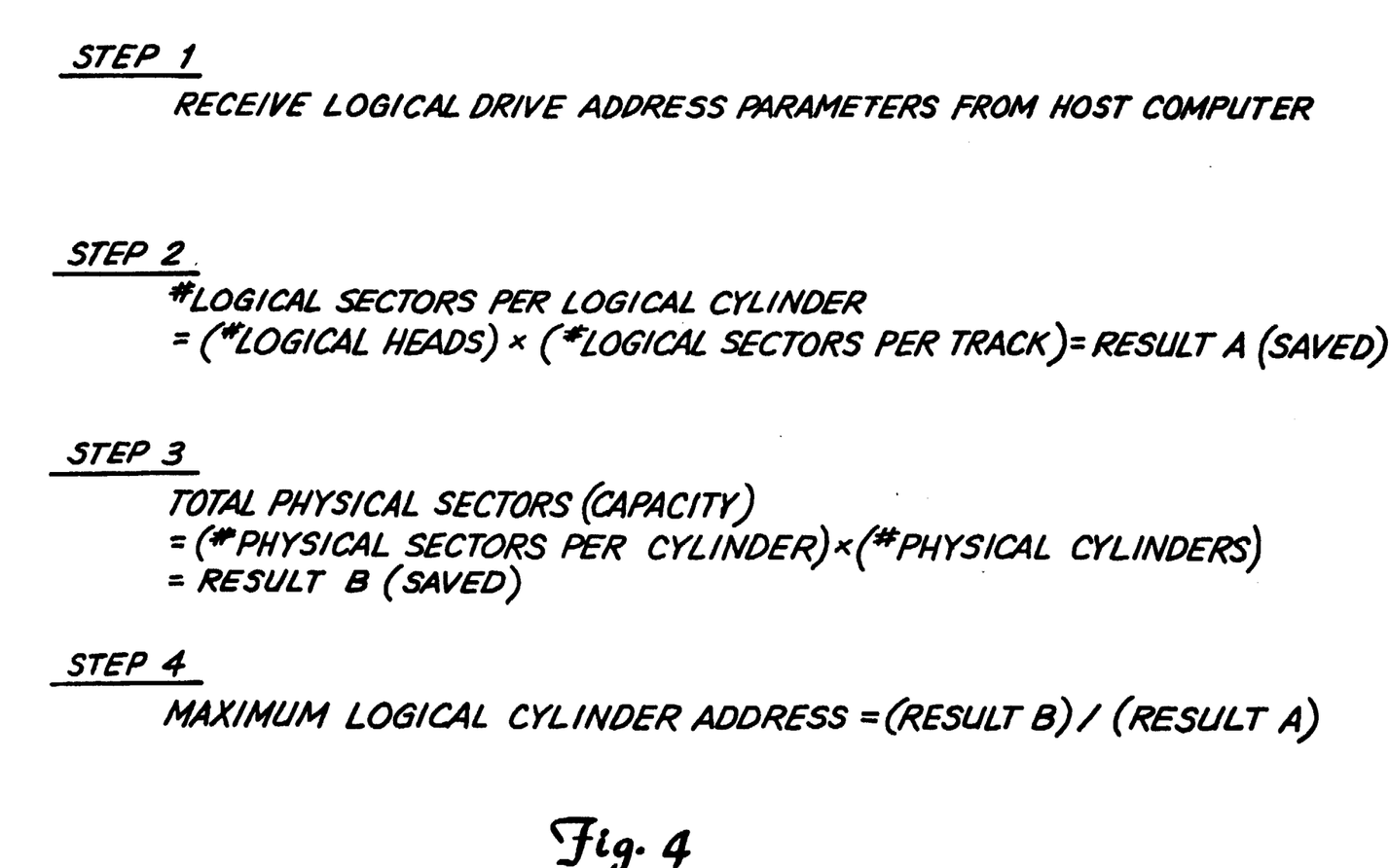
FIG. 4 shows the calculations performed by the disk drive controller to emulate the drive type expected by the host computer.

The initialization phase is essentially a four step process These steps are illustrated in FIG. 4. First, drive controller 16 receives the logical drive address parameters from the table in BIOS ROM 76 of host computer 12 The logical drive address parameters typically include the maximum number of logical sectors per track and the maximum logical head address that host computer 12 expects to access Second, drive controller 16 calculates the number of logical sectors per logical cylinder This is done by multiplying the number of logical heads, provided by host computer 12, by the number of logical sectors per track, which is also provided by host computer 12. This result (result A) is then saved.

Third, controller 16 computes the total number of physical sectors in disk drive 14 (the total physical storage capacity of disk drive 14). This is done by multiplying the number of physical sectors per cylinder, which is stored in memory in drive controller 16, by the number of physical cylinders in disk drive 14, which is also stored in memory in drive controller 16. This result (result B) is then saved Finally, drive controller 16 calculates the maximum logical cylinder address required to utilize the entire physical storage capacity of disk drive 14. (Note that the maximum logical cylinder address was not provided by host computer 12 during power up). The maximum logical cylinder address is calculated by dividing the total number of physical sectors in disk drive 14 (result B) by the number of logical sectors per logical cylinder (result A). At this point, drive controller 16 has stored the number of logical sectors per track and the maximum logical head address that the computer expects to access, as well as the number of logical sectors per cylinder and the maximum logical cylinder address that the computer may access. All of these values are saved and used in the conversion phase.

3. Conversion

Once the initialization phase has been performed, disk 14 is prepared to accept commands from host computer 12 requiring drive controller 16 to access or locate information on disks 42-50. The commands from host computer 12 typically include the logical cylinder address, logical head address, logical sector number and number of sectors to be accessed by host computer 12 as well as a command code. Typical command codes include Read, Write and Verify operations.

Drive controller 16 must convert the logical addresses and numbers provided by host computer 12 into corresponding physical addresses and numbers in order to access the proper data on disks 42-50. This conversion is essentially done in four steps and is shown in FIG. 5.

Figure 6A:
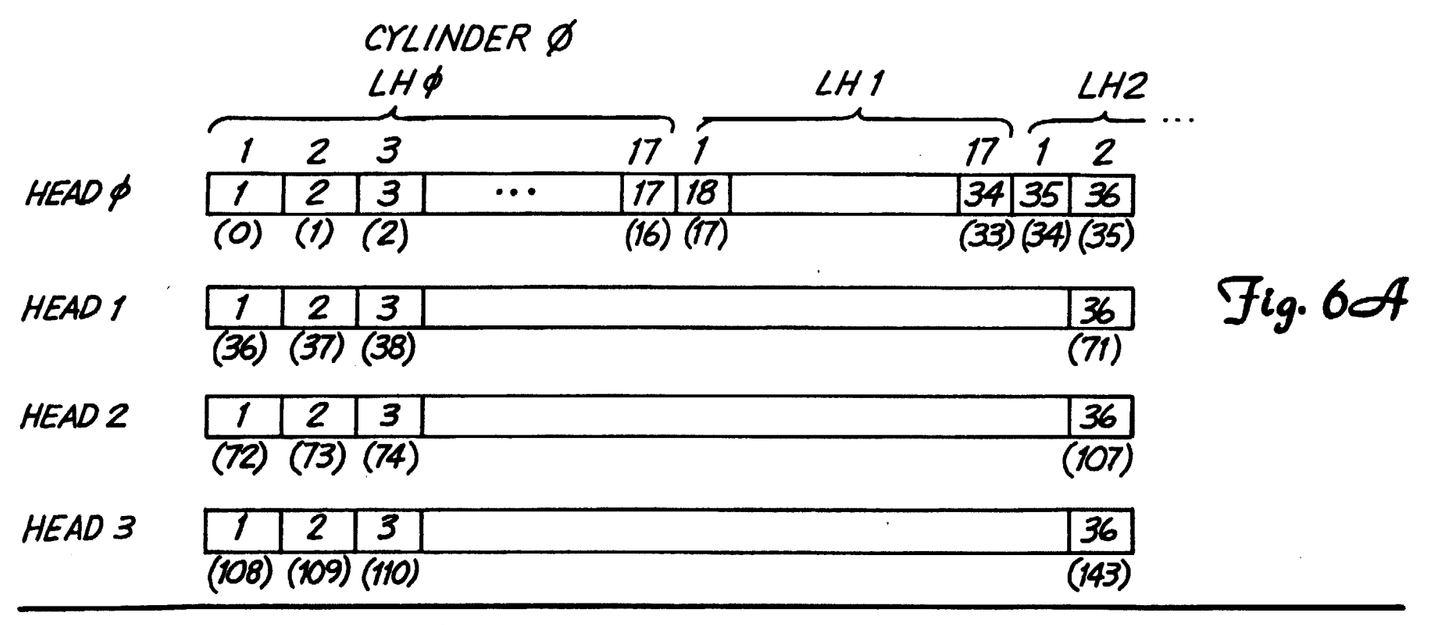
FIG. 6A illustrates the concept of a logical block address.
Figure 6B:
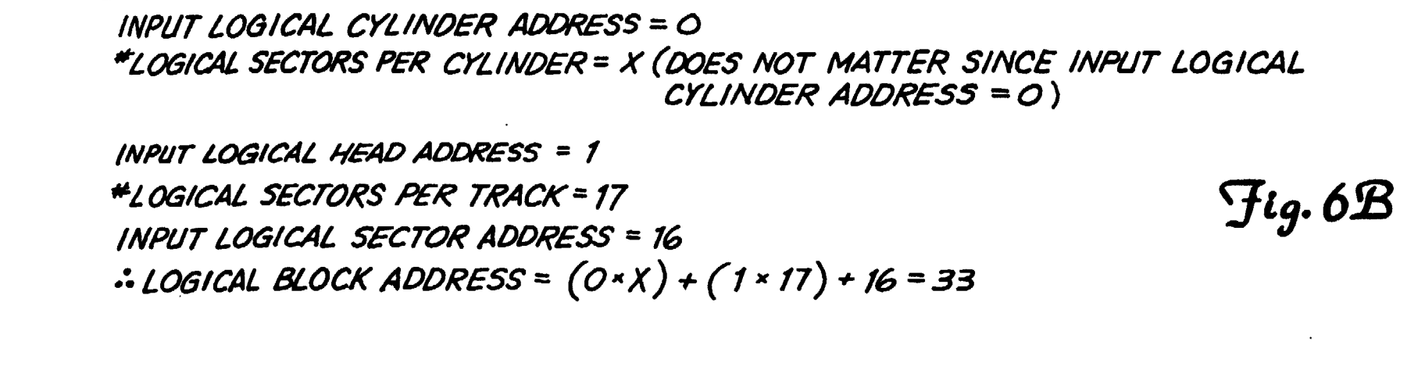
FIG. 6B illustrates the mathematical calculation of a logical block address.

First, drive controller 16 calculates a logical block address corresponding to the information to be accessed by host computer 12. FIGS. 6A and 6B illustrate the concept of a logical block address The logical block address uniquely identifies each individual sector in disk drive 14. The logical block address identifies the first sector in disk drive 14 as sector 0 and each subsequent sector is identified by a sequentially increasing address ending with the very last sector on the very last cylinder and corresponding to the very last head address.

For example, FIG. 6A shows a data storage system where the heads are positioned over cylinder 0. There are 36 physical sectors per track under each head. Therefore, heads 0, 1, 2 and 3 are each over tracks which have 36 sectors. The physical sector numbers are shown within the track in FIG. 6A and go from 1 to 36 in each track. However, the logical block address does not start at 1 with each new track. Rather, the logical block address starts at 0 for sector 1 of head 0 and cylinder 0 and simply increases sequentially from the first sector to the last in the disk drive. Hence, as shown in FIG. 6A, where a data storage system has only one cylinder and four heads, and where there are 36 physical sectors per track in the data storage system, the maximum logical block address is 143. The logical block addresses for the sectors shown in FIG. 6A are indicated in parenthesis below the physical sector number of each sector.

Figure 5:
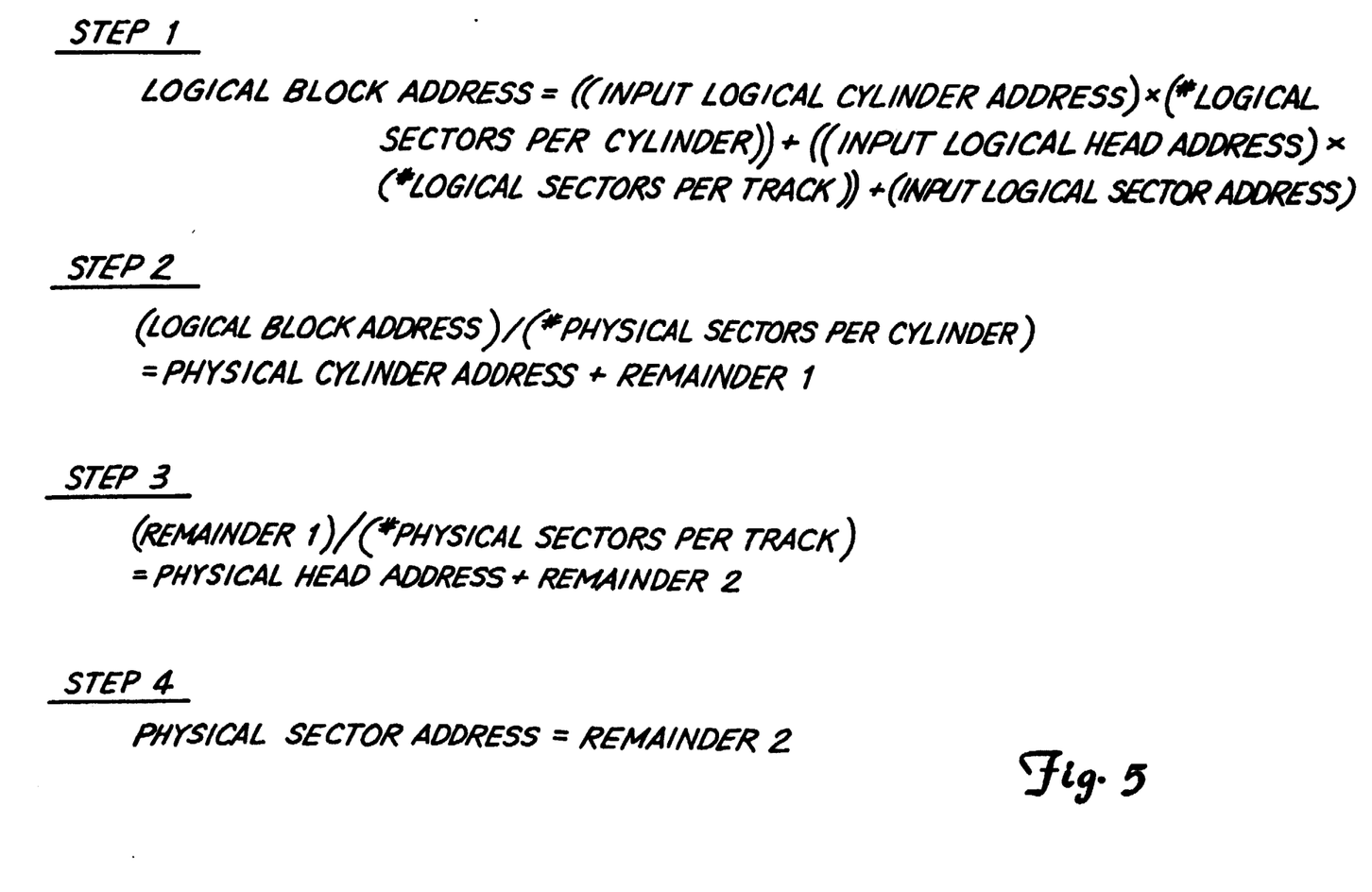
FIG. 5 shows calculations performed by the disk drive controller to access information in the disk file.

The logical block address is calculated as shown in FIG. 5. The product of the logical cylinder address from host computer 12 and the number of logical sectors per cylinder is added to the product of the logical head address from host computer 12 and the number of logical sectors per track. This, in turn, is added to the logical sector address from host computer 12. As an example, the logical block address for physical sector number 33 of head 0 in FIG. 6A is calculated in FIG. 6B.

Once the logical block address is calculated, drive controller 16 calculates the physical cylinder address corresponding to the logical address provided by host computer 12. The physical cylinder address is calculated by dividing the logical block address by the number of physical sectors per cylinder. That division yields the physical cylinder address plus remainder 1.

Next, the physical head address is calculated This is done by dividing remainder 1 by the number of physical sectors per track. This division yields the physical head address plus remainder 2.

Finally, the physical sector address is determined. The physical sector address equals remainder 2. Each logical address provided by host computer 12 is converted to a physical address in this manner. This allows host computer 12 to access the entire physical storage capacity of disk drive 14.

CONCLUSION

Drive controller 16 accepts any value for any combination of logical cylinders, logical heads or logical sectors per track and calculates the remaining parameters to initialize disk drive 14 for utilization of the entire physical storage capacity of disk drive 14. Drive controller 16 even accepts logical parameters which are greater than its physical parameters. This allows disk drive 14 to configure itself to emulate any disk drive type which happens to reside in the table in BIOS 76 or any other drive type.

Further, the present invention removes existing capacity access limitations. Since drive controller 16 accepts any value for logical address parameters, it is not limited to emulating disk drives having a maximum of 17 sectors per track. Nor is it limited to the number of cylinders, heads and sectors per track currently contained in power up programs in BIOS. Additionally, should the address capacity in BIOS change, disk controller 16 will accommodate the changes without redesign. Hence, the BIOS address limitations and the conventional 17 sector per track limitation are effectively removed.

For these reasons, the software used in drive controller 16 will not require any redesign for implementation in future disk drives which are designed with larger physical storage capacities. Nor would any redesign be required if users insert drive parameters in the table in BIOS ROM 76 which have not been previously included in that table.

Although the present invention has been described with reference to preferred embodiments, workers skilled in the art will recognize that changes may be made in form and detail without departing from the spirit and scope of the invention.

What is claimed is:

1. A disk drive for use in a data storage system of the type having a computer coupled to the disk drive, the disk drive comprising:
   storage media having a physical storage capacity, the storage media provided for storing data;
   transducer means for reading the data from the storage media and for writing the data to the storage media;
   configuring means for receiving a plurality of first signals representing first logical drive address parameters, for determining the physical storage capacity of the storage media, and for generating second signals representing second drive address parameters determined based on the first logical drive address parameters and the physical storage capacity of the storage media; and
   controller means, coupled to the transducer means and the configuring means and provided for connection to the computer, for controlling the disk drive as a function of the first logical drive address parameters and second drive address parameters.

2. The disk drive of claim 1 wherein the controller means further comprises:
   initialization means for initializing the disk drive based on the first logical drive address parameters and the second drive address parameters.

3. The disk drive of claim 1 wherein the controller means further comprises:
   accessing means for receiving address information signals representing address information, the address information identifying a location on the storage media to be accessed, and for accessing the location on the storage media based on the address information, the first logical drive address parameters and the second drive address parameters.

4. The disk drive of claim 3 wherein the storage media further comprises:
a plurality of magnetic disks each having a plurality of physical tracks for storing data, each track being divided into a plurality of physical sectors.

5. The disk drive of claim 4 wherein the transducer means further comprises:
a plurality of heads for reading magnetically encoded data from the magnetic disks and for encoding data on the disks, each head having a head address and wherein the combination of all heads defines a physical cylinder.

6. The disk drive of claim 5 wherein the first signals comprise:
a maximum logical sector number signal representing a maximum logical number of sectors per track to be accessed; and
a maximum logical head address signal representing a maximum logical head address to be accessed.

7. The disk drive of claim 6 wherein the second signals comprise:
a maximum logical cylinder address; and
a logical sector signal representing a number of logical sectors per logical cylinder.

8. The disk drive of claim 7 wherein the configuring means further comprises:
logical sector calculating means for calculating a maximum number of logical sectors per logical cylinder based on the maximum logical head address and the maximum number of logical sectors per track;
capacity calculating means for calculating the physical storage capacity based on a total number of physical cylinders in the disk drive and the number of physical sectors per physical cylinder; and
logical cylinder calculating means for calculating the maximum logical cylinder address based on the physical storage capacity and the maximum number of logical sectors per logical cylinder.

9. The disk drive of claim 8 wherein the logical sector calculating means comprises:
multiplying means for multiplying the maximum number of logical heads by the maximum number of logical sectors per track.

10. The disk drive of claim 8 wherein the capacity calculating means comprises:
multiplying means for multiplying the number of physical sectors per physical cylinder by the total number of physical cylinders.

11. The disk drive of claim 8 wherein the physical storage capacity is a total number of sectors in the disk drive.

12. The disk drive of claim 11 wherein the logical cylinder calculating means comprises:
dividing means for dividing the total number of sectors in the disk drive by the maximum number of logical sectors per logical cylinder.

13. The disk drive of claim 8 wherein the accessing means comprises:
block calculating means for calculating a logical block address based on the address information, the maximum logical sector number and the maximum logical head address, wherein the logical block address represents a sector on a magnetic disk corresponding to the address information received;
physical cylinder address calculating means for calculating a physical cylinder address based on the logical block address, and the number of physical sectors per physical cylinder;
physical head address calculating means for calculating a physical head address based on the physical cylinder address and the number of physical sectors per physical track; and
physical sector address calculating means for calculating a physical sector address based on the physical head address, wherein the physical cylinder address, the physical head address and the physical sector address correspond to the location identified by the address information received.

14. The disk drive of claim 13 wherein the address information signals comprise:
a logical cylinder address signal representing a logical cylinder address to be accessed;
a logical head address signal representing a logical head address to be accessed; and
a logical sector number signal representing a logical sector number to be accessed.

15. The disk drive of claim 14 wherein the block calculating means further comprises:
multiplying means for multiplying the logical cylinder address by the number of logical sectors per logical cylinder to provide a net cylinder address, and for multiplying the logical head address by the number of logical sectors per track to provide a net sector number; and
adding means for adding the net cylinder address, the net sector number and the logical sector address.

16. The disk drive of claim 15 wherein the cylinder address calculating means further comprises:
first dividing means for dividing the logical block address by the number of physical sectors per cylinder to provide the physical cylinder address and a first remainder.

17. The disk drive of claim 16 wherein the head address calculating means further comprises:
second dividing means for dividing the first remainder by the number of physical sectors per track to provide the physical head address and a second remainder the second remainder representing the physical sector address.

18. A method of configuring a disk drive for use in a data storage system of the type having a computer coupled to the disk drive, the disk drive including storage media having a physical storage capacity, the method comprising:
receiving a plurality of first logical drive address parameters;
determining the physical storage capacity of the storage media;
determining second drive address parameters based on the first logical drive address parameters and the physical storage capacity of the storage media; and
controlling the disk drive as a function of the first and second drive address parameters.

19. The method of claim 18 wherein the step of controlling further comprises: initializing the disk drive based on the first and second drive address parameters.

20. The method of claim 18 wherein the step of controlling further comprises:
receiving address information identifying a location on the storage media to be accessed; and
accessing the location on the storage media based on the address information, the first logical drive address parameters and the second drive address parameters.

21. The method of claim 20 wherein the step of controlling the disk drive further comprises:
controlling a plurality of magnetic disks each having a plurality of physical tracks for storing data, each track being divided into a plurality of physical sectors; and
controlling a plurality of heads for reading magnetically encoded data from the magnetic disks and for encoding data on the disks, each head having a head address and the combination of all heads defining a physical cylinder.

22. The method of claim 21 wherein the step of receiving first logical drive address parameters further comprises:
receiving a maximum logical sector number representing a maximum number of logical sectors per track to be accessed; and
receiving a maximum logical head address representing a maximum logical head address to be accessed.

23. The method of claim 22 wherein the step of determining second logical drive address parameters further comprises:
determining a maximum logical cylinder address based on the maximum logical sector number, the maximum logical head address and the physical storage capacity of the storage media.

24. The method of claim 23 wherein the step of determining the maximum logical cylinder address further comprises:
calculating a maximum number of logical sectors per logical cylinder based on the maximum logical head address and the maximum number of logical sectors per track;
calculating the maximum logical cylinder address based on the physical storage capacity and the maximum number of logical sectors per logical cylinder.

25. The method of claim 24 wherein the step of determining the physical storage capacity further comprises:
multiplying the number of physical sectors per physical cylinder by a total number of physical cylinders in the disk drive.

26. The method of claim 24 wherein the step of calculating the maximum logical cylinder address further comprises:
dividing the total number of sectors in the disk drive by the maximum number of logical sectors per logical cylinder.

27. The method of claim 24 wherein the step of accessing further comprises:
calculating a logical block address based on the address information, the maximum logical sector number and the maximum logical head address, where the logical block address represents a sector on a magnetic disk corresponding to the address information received;
calculating a physical cylinder address based on the logical block address and the number of physical sectors per physical cylinder;
calculating a physical head address based on the physical cylinder address and the number of physical sectors per physical track; and
calculating a physical sector address based on the physical head address, wherein the physical cylinder address, the physical head address and the physical sector address correspond to the location identified by the address information received.

28. The method of claim 27 wherein the step of receiving address information further comprises:
receiving a logical cylinder address to be accessed;
receiving a logical head address to be accessed; and
receiving a logical sector number to be accessed.

29. The method of claim 28 wherein the step of calculating the logical block address further comprises:
multiplying the logical cylinder address by the number of logical sectors per logical cylinder to provide a net cylinder address;
adding the net cylinder address, the net sector number and the logical sector address.

30. The method of claim 29 wherein the step of calculating a physical cylinder address further comprises:
dividing the logical block address by the number of physical sectors per cylinder to provide a physical cylinder address and a first remainder.

31. The method of claim 30 wherein the step of calculating a physical head address further comprises:
dividing the first remainder by the number of physical sectors per track to be provide the physical head address and a second remainder wherein the second remainder comprises the physical sector address.

32. A disk drive controller for use in a disk drive of the type having storage media with a physical storage capacity for storing date, transducers for reading the data from the storage media and for writing the data to the storage media, the disk drive being operable in a data storage system of the type having a computer coupled to the disk drive, the disk drive comprising:
configuring means for receiving a plurality of first signals representing first logical drive address parameters, for determining the physical storage capacity of the storage media, and for generating second signals representing second drive address parameters based on the first logical drive address parameters and the physical storage capacity of the storage media; and
controller means, coupled to the configuring means and provided for connection to the computer, for controlling the disk drive as a function of the first and second drive address parameters.

33. The disk drive controller of claim 32 wherein the controller means further comprises:
initialization means for initializing the disk drive based on the first logical drive address parameters and the second drive address parameters.

34. The disk drive controller of claim 32 wherein the controller means further comprises:
accessing means for receiving address information signals representing address information, the address information identifying a location on the storage media to be accessed, and for accessing the location on the storage media based on the address information, the first logical drive address parameters and the second drive address parameters.

35. The disk drive controller of claim 34 wherein the storage media further comprises:
a plurality of magnetic disks each having a plurality of physical tracks for storing data, each track being divided into a plurality of physical sectors.

36. The disk drive controller of claim 35 wherein the transducers further comprise:
a plurality of heads for reading magnetically encoded data on the disks, each head having a head address and wherein the combination of all heads defines a physical cylinder.

37. The disk drive controller of claim 36 wherein the first signals comprise:
   a maximum logical sector number signal representing a maximum logical number of sectors per track to be accessed; and
   a maximum logical head address signal representing a maximum logical head address to be accessed.

38. The disk drive controller of claim 37 wherein the second signals comprise:
   a maximum logical cylinder address signal representing a maximum logical cylinder address; and
   a logical sector signal representing a number of logical sectors per logical cylinder.

39. The disk drive controller of claim 38 wherein the configuring means further comprises:
   logical sector calculating means for calculating a maximum number of logical sectors per logical cylinder based on the maximum logical head address and the maximum number of logical sectors per track;
   capacity calculating means for calculating the physical storage capacity based on a total number of physical cylinders in the disk drive and the number of physical sectors per physical cylinder; and
   logical cylinder calculating means for calculating the maximum logical cylinder address based on the physical storage capacity and the maximum number of logical sectors per logical cylinder.

40. The disk drive controller of claim 39 wherein the logical sector calculating means comprises:
   multiplying means for multiplying the maximum number of logical heads by the maximum number of logical sectors per track.

41. The disk drive controller of claim 4 wherein the capacity calculating means comprises:
   multiplying means for multiplying the number of physical sectors per physical cylinder by the total number of physical cylinders.

42. The disk drive controller of claim 39 wherein the physical storage capacity is a total number of sectors in the disk drive.

43. The disk drive controller of claim 42 wherein the logical cylinder calculating means comprises:
   dividing means for dividing the total number of sectors in the disk drive by the maximum number of logical sectors per logical cylinder.

44. The disk drive controller of claim 39 wherein the accessing means comprises:
   block calculating means for calculating a logical block address based on the address information, the maximum logical sector number and the maximum logical head address, wherein the logical block address represents a sector on a magnetic disk corresponding to the address information received;
   physical cylinder address calculating means for calculating a physical cylinder address based on the logical block address, and the number of physical sectors per physical cylinder;
   physical sector address calculating means for calculating a physical sector address based on the physical head address, wherein the physical cylinder address, the physical head address and the physical sector address correspond to the location identified by the address information received.

45. The disk drive controller of claim 44 wherein the address information signals comprise:
   a logical cylinder address signal representing a logical cylinder address to be accessed;
   a logical head address signal representing a logical head address to be accessed; and
   a logical sector number signal representing a logical sector number to be accessed.

46. The disk drive controller of claim 45 wherein the block calculating means further comprises:
   multiplying means for multiplying the logical cylinder address by the number of logical sectors per logical cylinder to provide a net cylinder address, and for multiplying the logical head address by the number of logical sectors per track to provide a net sector number; and
   adding means for adding the net cylinder address, the net sector number and the logical sector address.

47. The disk drive controller of claim 46 wherein the cylinder address calculating means further comprises:
   first dividing means for dividing the logical block address by the number of physical sectors per cylinder to provide the physical cylinder address and a first remainder.

48. The disk drive controller of claim 47 wherein the head address calculating means further comprises:
   second dividing means for dividing the first remainder by the number of physical sectors per track to provide the physical head address and a second remainder, the second remainder representing the physical sector address.

* * * * *

UNITED STATES PATENT AND TRADEMARK OFFICE
CERTIFICATE OF CORRECTION

PATENT NO. : 5,018,095

DATED : May 21, 1991

INVENTOR(S) : Haim N. Nissimov

It is certified that error appears in the above-identified patent and that said Letters Patent is hereby corrected as shown below:

Col. 9, line 35, after "track;", insert --and--

Col. 11, line 37, delete "claim 4", insert --claim 40--.

Signed and Sealed this

First Day of December, 1992

*Attest:*

DOUGLAS B. COMER

*Attesting Officer*      *Acting Commissioner of Patents and Trademarks*